United States Patent [19]
Nakano

[11] Patent Number: 5,805,563
[45] Date of Patent: Sep. 8, 1998

[54] OPTICAL INFORMATION RECORDING MEDIUM ON WHICH A VISIBLE DISPLAY HAVING A STEREOSCOPICALLY VIEW EFFECT AND A DEPTH VIEWING EFFECT CAN BE MADE

[75] Inventor: Kazuhiko Nakano, Kawasaki, Japan

[73] Assignee: Nippon Columbia, Ltd., Tokyo, Japan

[21] Appl. No.: 847,722

[22] Filed: Apr. 22, 1997

[30] Foreign Application Priority Data

Sep. 19, 1996 [JP] Japan ..................................... 8-247666

[51] Int. Cl.⁶ ....................................................... G11B 7/24
[52] U.S. Cl. ..................... 369/275.1; 369/275.4
[58] Field of Search ............................. 369/275.1, 275.2, 369/275.3, 275.4, 13, 288, 273, 277, 278, 279; 156/245, 60; 428/64.1, 64.2

[56] References Cited

U.S. PATENT DOCUMENTS 5,509,991  4/1996  Choi ......................................... 156/245

FOREIGN PATENT DOCUMENTS 2017379  10/1979  United Kingdom .

*Primary Examiner*—Ali Neyzari
*Attorney, Agent, or Firm*—Dickstein Shapiro Morin & Oshinsky LLP

[57] ABSTRACT

An information recording medium has such a structure that an information substrate is bonded to a dummy substrate, and provides a visible display having a stereoscopic viewing effect and a depth-viewing effect. The information recording medium includes a first transparent substrate having an information recording face covered by a reflection film at one side thereof, and a second transparent substrate having no information recording face, which are bonded to each other through an adhesive layer. The reflection film is covered by a transparent protection film, and plural surfaces out of the obverse and back surfaces of the second transparent substrate, the obverse surface of the transparent protection film and the back surface of the reflection film are provided with print layers. The obverse surface of the transparent protection film and the back surface of the second transparent substrate are bonded to each other through the adhesive layer.

8 Claims, 4 Drawing Sheets

PRIOR ART

OPTICAL INFORMATION RECORDING MEDIUM ON WHICH A VISIBLE DISPLAY HAVING A STEREOSCOPICALLY VIEW EFFECT AND A DEPTH VIEWING EFFECT CAN BE MADE

BACKGROUND OF THE INVENTION

1. Field of the Invention

The present invention relates to an optical information recording medium having that two transparent substrates are bonded together, and particularly to an optical information recording medium, such as DVD (Digital Versatile Disk) or the like, in which a dummy substrate is bonded to a substrate having an information recording face.

2. Description of Related Art

Recently, an optical information recording medium with a large capacity and a high recording density has been practically used. A compact disc (CD), a laser disc (LD) and so on have become widespread as a medium which is exclusively used for reproduction (i.e., read-only medium). Also, CD-ROM, video CD, and so on have become widespread.

In addition, a phase-change type disc (PD), a magneto-optical disc (MO) and so on are known as a rewritable medium, and they have been practically used as a storage medium for computers or the like. Further, a write-once optical disc (CD-R) in which information is writable only once, but reproduced many times by a CD or CD-ROM player, has gained a foothold as a prototype of a disc, a master disc, a storage medium for a computer or the like.

However, these optical information recording media are in conformity with respective independent standards, and most of these media are not compatible with one another. Particularly, the writable optical disc has not becomes widespread, and the read-only media are beginning to lose their superiority as large-capacity media because a hard disc having a recording capacity in the gigabyte range is becoming more common place.

In such a situation, an optical disc which contains audio data (like a CD), high-quality motion picture data (like an LD) and computer data (like a CD-ROM), and into which the read-only disc is integrated has been proposed as a next-generation multimedia medium, and its standards were integrated as a DVD in December 1995. In order to further increase the recording density compared with the conventional optical information recording medium, in the DVD, the size of pits used to record information is reduced so as to be less than half of that of the CD in both the radial direction and the circumferential direction. Further, in order to suppress a reproduction deterioration effect due to tilt of a disc, the thickness of the substrate of the disc is set to 0.6 mm, and also in order to maintain mechanical strength, the disc is designed by bonding two substrates together. Accordingly, information can be recorded on one or both of the two bonded substrates of the DVD. Therefore, the DVD can be designed as various reproduction types such as a one-side reproduction type, a double-side reproduction type, a one-side two-layer reproduction type and a double-side two-layer reproduction type.

First, the disc structure of each type of DVD will be briefly described with reference to FIGS. 7 to 10.

FIG. 7 is a cross-sectional view showing the structure of a one-side reproduction type DVD. In FIG. 7, reference numeral 1 represents a first transparent substrate, reference numeral 2 represents a reflection film, reference numeral 4 represents a second transparent substrate, reference numeral 5 represents an adhesive layer and reference numeral 31 represents a pickup. This structure corresponds to the structure of DVD-5 based on the DVD standards, and it represents a one-side one-layer reproduction type optical disc.

The first transparent substrate 1 is a substrate on which information is recorded. A pit array is formed on the back surface of the first transparent substrate 1, and then covered by a reflection film 2. The pit array is formed while being modulated by data to be recorded. The second transparent substrate 4 on which no pit array is formed is a dummy substrate having no information, and it is bonded to the first transparent substrate 1 through the adhesive layer 5. The adhesive layer 5 comprises a transparent ultraviolet-ray cured resin layer. The DVD-5 is subjected to one-side reproduction by the pickup 31. The recording capacity of DVD-5 is equal to 4.7 GB (gigabyte), and it is about seven times that of a CD. Therefore, motion pictures whose quality is equal to or more than that of a laser disc can be recorded on the DVD-5 for two hours. The reproduction of DVD-5 is performed on only one side thereof, and the second transparent substrate 4 on which no information is recorded may be used as a substrate having print layer as in the case of the conventional CD.

FIG. 8 is a cross-sectional view showing the structure of a double-side reproduction type DVD. The same elements as those of FIG. 7 are represented by the same reference numerals, and the description thereof is omitted. Reference numeral 41 represents a reflection film. This structure corresponds to the structure of DVD-10 based on the DVD standards, and it represents a double-side one-layer reproduction type optical disc. In the DVD-10, like the first transparent substrate 1, the second transparent substrate 4a also has information thereon. That is, a pit array is formed on the back surface of the second transparent substrate 4a, and then covered by a reflection film 41. The first transparent substrate 1 and the second transparent substrate 4a are bonded to each other through the adhesive layer 5. The recording capacity of the DVD-10 is equal to about two times that of the DVD-5 shown in FIG. 7, and the reproduction of the DVD-10 is performed one side at a time while reversing the optical disc. In a player having two pickups 31 therein, the reproduction of both sides of the disc may be automatically performed.

FIG. 9 is a cross-sectional view showing the structure of a one-side two-layer reproduction type DVD. In FIG. 9, the same elements as those of FIG. 7 are represented by the same reference numerals, and the description thereof is omitted. Reference numeral 51 represents a semi-transparent film, reference numeral 52 represents a transparent adhesive layer and reference numeral 53 represents a reflection film. This structure corresponds to the structure of DVD-9 based on the DVD standards, and it represents a one-side two-layer reproduction type optical disc. A first transparent substrate 1 has information thereon. A pit array is formed on the back surface of the transparent substrate 1 and then coated with the semi-transparent film 51. A second transparent substrate 4a has information thereon, and a pit array is formed on the back surface of the second transparent substrate 4a, and then coated with the reflection film 53 having high reflectivity such as aluminum or the like.

The first transparent substrate 1 and the second transparent substrate 4a are bonded to each other through the adhesive layer 52 of transparent ultraviolet-ray cured resin (UV resin) so as to be spaced from each other at an interval of several tens of micrometers. In the DVD-9 thus constructed, a first information recording face comprising the pit array which is formed on the back surface of the first transparent substrate 1 and covered by the semi-transparent film 51 is reproduced by the pickup 31. Further, a second information recording face comprising the pit array which is formed on the back surface of the second transparent substrate 4a and covered by the reflection film 53 is reproduced by the same pickup 31 which has its focus position varied. In the DVD-9, the reproduction of the information faces of both substrates can be performed without reversing the optical disc to reproduce both sides of the optical disc nor using a player having two pickups 31 at the upper and lower sides with respect to the optical disc.

By optimizing the reflectivity and the thickness of the semi-transparent film 51, the reflectivity of each of the first information recording face and the second information recording face can be adjusted to 20 to 30%. The thickness of the ultraviolet-ray cured resin 52 is determined so as to meet the conditions that the focus servo can be performed on each layer, no cross-talk occurs between layers and the aberration effect due to deviation of the thickness of the substrate from 0.6 mm is reduced.

FIG. 10 is a cross-sectional view showing the structure of a double-side two-layer reproduction type DVD. In FIG. 10, the same elements as those of FIGS. 7 to 9 are represented by the same reference numerals, and the description thereof is omitted. Reference numerals 11 and 62 represent semi-transparent films, reference numerals 12 and 63 represent transparent resin layers, reference numerals 13 and 64 represent reflection layers, and reference numeral 61 represents an adhesive layer. This structure corresponds to the structure of DVD-18 based on the DVD standards, and it represents a double-side two-layer reproduction type optical disc.

In the DVD-18, a pit array is formed on the back surface of the first transparent substrate 1, and then covered by the semi-transparent film 11. Further, the transparent resin layer 12 of ultraviolet-ray cured resin on which a pit array is formed by a 2P (photopolymerization) method, is formed on the semi-transparent film 11. The transparent resin layer 12 is covered by a reflection film 13. The same is applied to the second transparent substrate 4a. That is, a pit array is formed on the back surface of the second transparent plate 4a, and then covered by the semi-transparent film 62. Further, by the 2P method, a pit array is also formed on the transparent resin layer 63 of ultraviolet-ray cured resin formed on the semi-transparent film 62. The transparent resin layer 63 is covered by the reflection film 64. The first transparent substrate 1 and the second transparent substrate 4a are bonded to each other through an adhesive layer 61 with the read-out faces thereof facing outwardly.

In the case of the DVD-18, a first information recording face comprising the pit array which is formed on the back surface of the first transparent substrate 1 and covered by the semi-transparent film 11 is reproduced by the pickup 31. Further, a second information recording face comprising the pit array which is formed on the surface of the transparent resin layer 12 and covered by the reflection film 13 is reproduced by the same pickup 31 which has its focus position varied. The same is applied to the second transparent substrate 4a. That is, the third information recording face comprising the pit array which is formed on the back surface of the second transparent substrate 4a and covered by the semi-transparent film 62 is reproduced by the same or another pickup 31. Further, the fourth information recording face comprising the pit array which is formed on the surface of the transparent resin layer 63 and covered by the reflection film 64 is reproduced by the same or the other pickup 31 which has its focus position varied.

As described above, the DVD-18 is reproduced every two layers one side at a time by reversing the optical disc, or automatically reproduced for all the four layers of both sides by using a player having two pickups mounted thereon to reproduce both sides of the disc.

SUMMARY OF THE INVENTION

In a single-substrate type optical disc such as a CD, CD-ROM or the like as described above, information such as a title, a manufacturer and so on which are connected with the recording information is printed on the face which is opposite to the face from which recorded signals are reproduced. Further, the DVD-5 which is described with reference to FIG. 7 is constructed so that the 0.6 mm-thickness first transparent substrate having recording information thereon and the 0.6 mm-thickness second transparent substrate 4 which is a dummy substrate having no recording information are bonded to each other. The print information which are connected with the recording information is printed on any one of the obverse surface and the bonding face of the second transparent substrate 4.

However, the printed information layer of the conventional optical disc or the DVD-5 is made on only one surface of the disc, and thus a visible display which provides a depth or three-dimensional (stereoscopic) effect to a viewer is not possible.

An object of the present invention is to provide an optical information recording medium on which a visible display having a stereoscopically viewing effect and a depth-viewing effect can be made in an optical information recording medium such as DVD-5 comprising an information-recorded substrate and a dummy substrate which are bonded together.

Therefore, in order to attain the above object, according to a first aspect of the present invention, an optical information medium comprises a first transparent substrate having an information recording face covered by a reflection film, a second transparent substrate having no information recording face, an adhesive layer through which the first transparent substrate and the second transparent substrate are bonded to each other, and a print layer being provided to at least a plurality of surfaces of the obverse surfaces, back surfaces of the second transparent substrate and the back surface of the reflection film.

According to a second aspect of the present invention, an optical information medium comprises a first transparent substrate having an information recording face covered by a reflection film, a second transparent substrate having no information recording face, an adhesive layer through which the first transparent substrate and the second transparent substrate are bonded to each other, a transparent protection film for covering the reflection film, and a print layer being provided to at least a plurality of surfaces of the obverse surfaces, back surfaces of the second transparent substrate, the obverse surface of the transparent protection film and the back surface of the reflection film.

In the optical information recording media of the first and second aspect of the present invention, a print layer may be provided in an area which is not overlapped with the information recording area of the information recording face and is on at least one of the obverse and back surfaces of the first transparent substrate.

DETAILED DESCRIPTION OF THE PREFERRED EMBODIMENTS

Preferred embodiments according to the present invention will be described hereunder with reference to the accompanying drawings.

Figure 1:
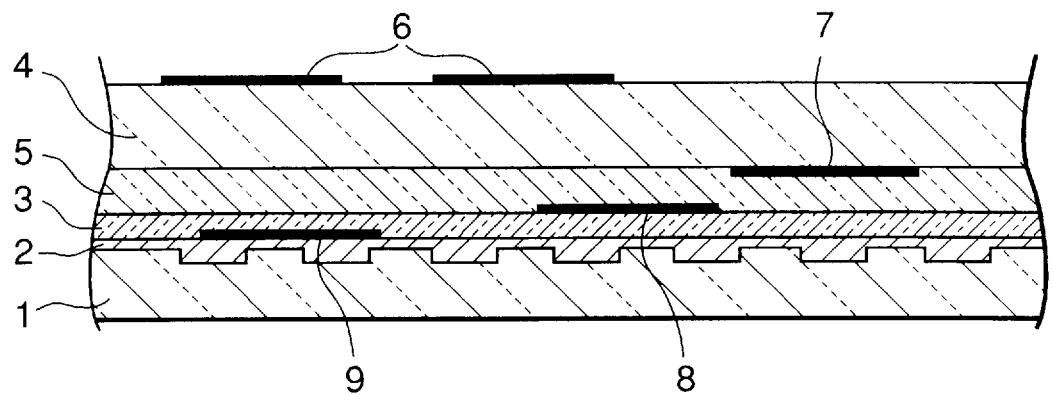
FIG. 1 is a cross-sectional view showing an optical disc according to a first embodiment of the present invention.
Figure 7:
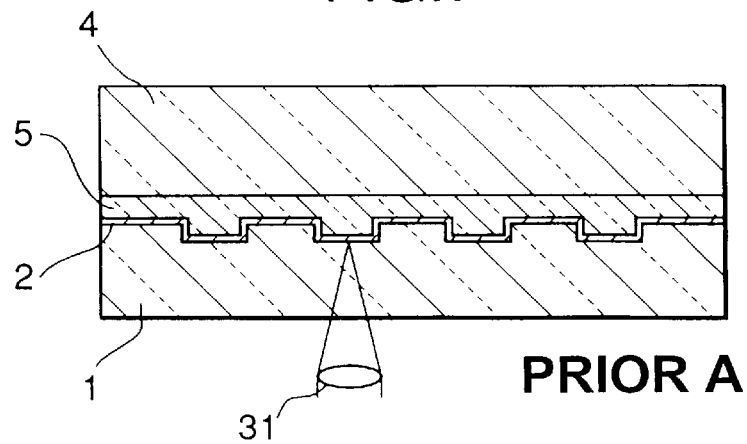
FIG. 7 is a cross-sectional view showing an optical disc to show the structure of DVD-5.
Figure 8:
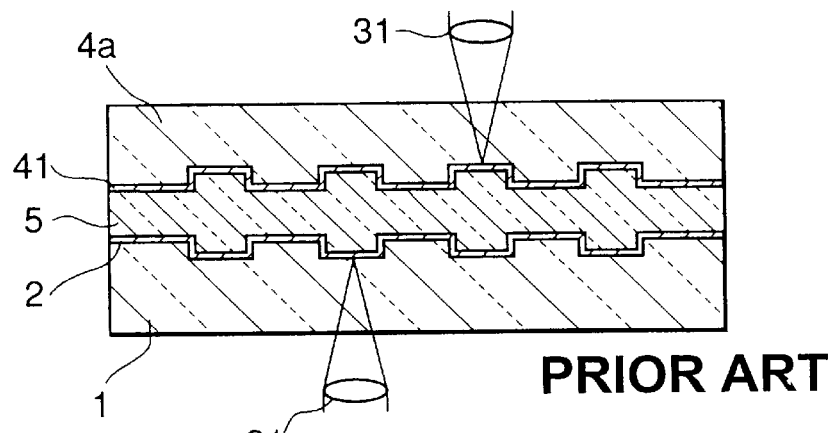
FIG. 8 is a cross-sectional view showing an optical disc to show the structure of DVD-10.

FIG. 1 is a cross-sectional view showing an optical disc according to a first embodiment of the present invention. In FIG. 1, the same elements as those of FIG. 7 are represented by the same reference numerals, and the description thereof is omitted.

Reference numeral 3 represents a transparent protection film, and reference numerals 6 to 9 represent print layers. In order to simplify the description, a pit array formed on an information recording face is illustrated as being uneven as in the case of FIG. 7, however, a print is made to have such a length and area that the unevenness of the pit array can be neglected. Further, the back surface of the reflection film 2 is illustrated as a smoothed surface, but, it is ordinarily an uneven surface which is conformable with the pit array. However, this unevenness is negligibly small with respect to the area and thickness of the print layers, and thus the reflection film 2 may be formed so that the back surface thereof is a smooth surface.

In this embodiment, the first transparent substrate 1 which has at one side thereof an information recording face covered by the reflection film 2 and the second transparent substrate 4 having no information recording face are bonded to each other through the transparent adhesive layer 5 to form an optical disc. The reflection film 2 is covered by the protection film 3, and the print layers 6 to 9 are provided on plural surfaces of the obverse and back surfaces of the second transparent substrate 4, the obverse surface of the transparent protection film 3 and the back surface of the reflection film 2. The obverse surface of the transparent protection film 3 and the back surface of the second transparent substrate 4 are bonded to each other through the adhesive layer 5.

Here, in the present specification, the obverse surface of the second transparent substrate 4 means the surface which confronts the outside after it is bonded, and the opposite surface to the obverse surface is defined as the back surface of the second transparent substrate 4. Further, the obverse surface of the transparent protection film 3 means the surface which can be seen after covering the reflection film 2, and the opposite surface thereto which opposes the reflection film 2 is defined as the back surface of the transparent protection film 3. Likewise, the obverse surface of the reflection film 2 means the surface from which information is read out by the pickup, and the opposite surface thereto is defined as the back surface.

The obverse surface of the second transparent substrate 4 serves as a first print face, and it is provided with the print layer 6. Further, the back surface of the second transparent substrate 4 serves as a second print face, and it is provided with the print layer 7. The obverse surface of the transparent protection film 3 which coats the reflection film 2 by using ultraviolet-ray cured resin serves as a third print face, and it is provided with the print layer 8. Further, the back surface of the reflection film 2 deposited on the first transparent substrate 1 having recording information serves as a fourth print face, and it is provided with the print layer 9. Both surfaces of the second transparent substrate 4 are not necessarily required to be perfectly smooth, and it is sufficient to smooth both the surfaces to the extent that the print layers can be provided on these surfaces. Besides, these surfaces may be roughened to enhance adhesion (coating) of print ink to the print face.

Figure 2:
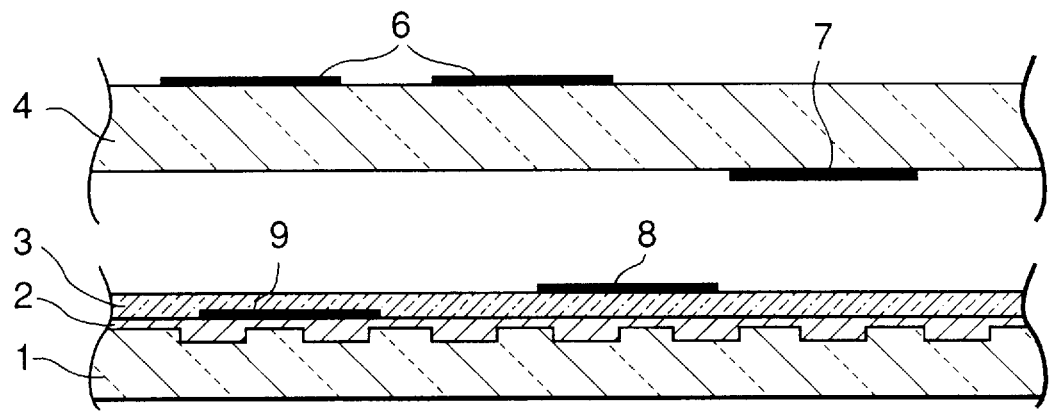
FIG. 2 is a cross-sectional view showing the optical disc shown in FIG. 1 before the first and second transparent substrates are bonded together.

FIG. 2 is a cross-sectional view showing the optical disc shown in FIG. 1 before the first and second transparent substrates are bonded together. In FIG. 2, the same elements as those of FIGS. 1 and 7 are represented by the same reference numerals, and the description thereof is omitted.

Plural faces out of the first to fourth print faces are printed, and then the first transparent substrate 1 and the second transparent substrate 4 are bonded together through the transparent adhesive layer 5 formed of ultraviolet-ray cured resin. Through this process, the cross-sectional structure as shown in FIG. 1 is obtained. The print layer 9 is printed before the transparent protection film 3 of ultraviolet-ray cured resin is coated. The print layer 6 may be printed after the bonding process.

After the bonding process is completed, the gap interval between the first print face of the print layer 6 and the second print face of the print layer 7 is equal to the thickness of the second transparent substrate 4, that is, it is equal to about 0.6 mm. Further, the gap interval between the second print face of the print layer 7 and the third print face of the print layer 8 is equal to the thickness of the transparent adhesive layer 5 serving as a space layer for the bonded substrates, and thus it is equal to several micrometers to several tens of micrometers. The gap interval between the third print face of the print layer 8 and the fourth print face of the print layer 9 is equal to the thickness of the transparent protection film 3, and thus it is equal to several micrometers to several tens of micrometers.

As described above, the print layers are provided onto the plural print faces which are located at different positions in the thickness direction of the optical disc, so that the print display can be performed with a depth-viewing effect and a three-dimensional effect. Further, the print layers are dispersively provided on the plural print faces, so that even if a single color display is printed on each print face, an overall print display can be viewed as a multi-color display.

Figure 3:
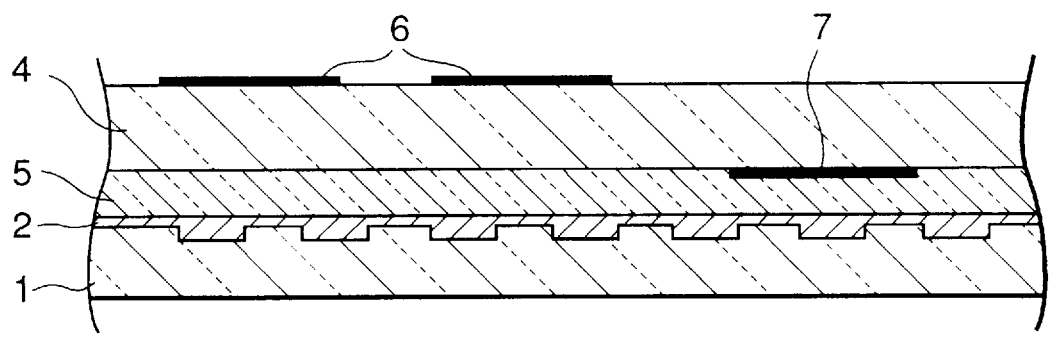
FIG. 3 is a cross-sectional view showing an optical disc according to a second embodiment of the present invention.

FIG. 3 is a cross-sectional view showing an optical disc according to a second embodiment of the present invention. In FIG. 3, the same elements as those of FIG. 7 are represented by the same reference numerals, and the description thereof is omitted. In this embodiment, no transparent protection film 3 is provided unlike the first embodiment shown in FIG. 1. Further, in this embodiment, the print layer comprises two layers of a print layer 6 and a print layer 7.

Figure 4A:
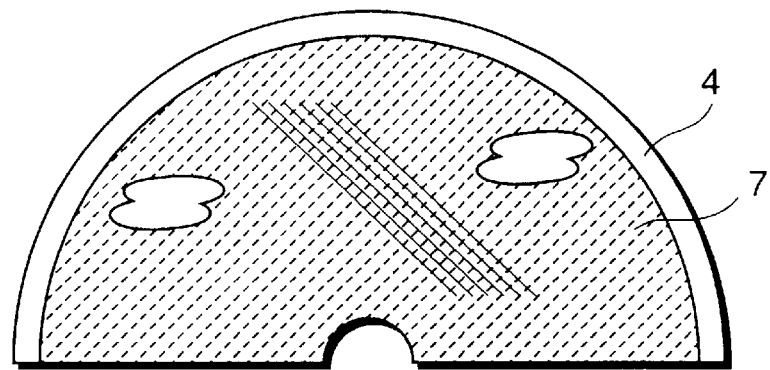
FIGS. 4A to 4C are plane views showing the optical disc shown in FIG. 3.
Figure 4B:
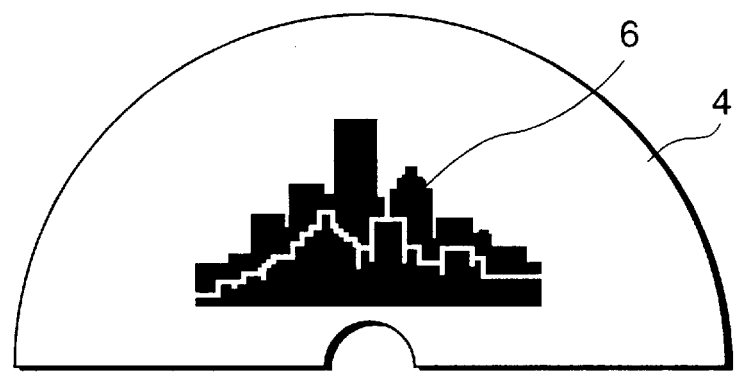
Figure 4C:
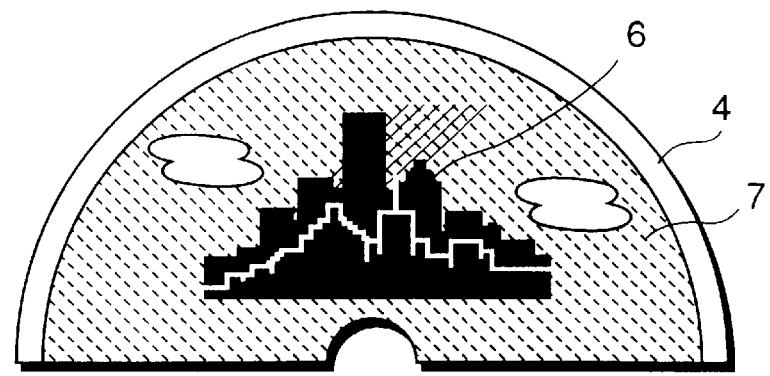

FIGS. 4A to 4C are plane views of the optical disc shown in FIG. 3. FIG. 4A shows the print layer on the second print face, FIG. 4B shows the print layer on the first print face and FIG. 4C shows the outline of the completed optical disc. In FIGS. 4A to 4C, the same elements as those of FIG. 3 are represented by the same reference numerals.

As shown in FIG. 4A, the print layer 7 serving as a picture representing the background is formed on the second print face which corresponds to the back surface side of the second transparent substrate 4. Further, as shown in FIG. 4B, the print layer 6 serving as a picture representing a close (near) view is formed on the first print face corresponding to the obverse surface side of the second transparent substrate 4. The second transparent substrate 4 is reversed, and then bonded to the first transparent substrate 1 shown in FIG. 3 to thereby complete the optical disc shown in FIG. 4C. In this optical disc, the positional relationship between the background and the near view is varied in accordance with the viewing direction to the optical disc, so that the print display provides a stereoscopic and depth viewing effect to a viewer. It is needless to say that the picture (pattern) can be freely selected, and characters such as a title and so on may be printed. As described above, according to the present invention, the characteristics of the bonded disc can be effectively used, and a print display having an enhanced added value can be provided.

Figure 5:
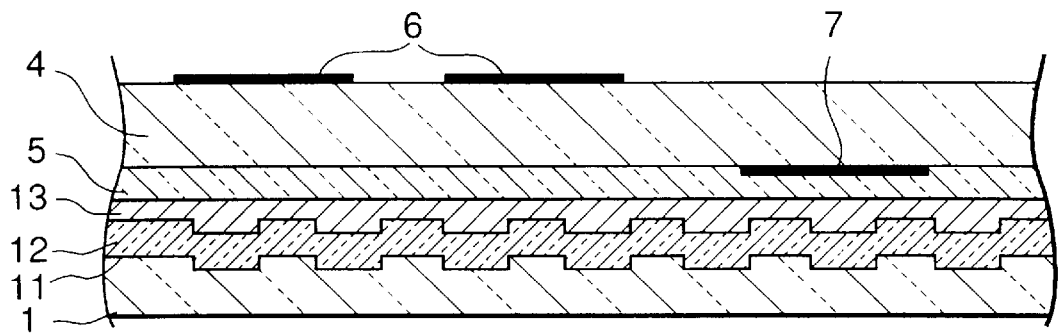
FIG. 5 is a cross-sectional view showing an optical disc according to a third embodiment of the present invention.
Figure 10:
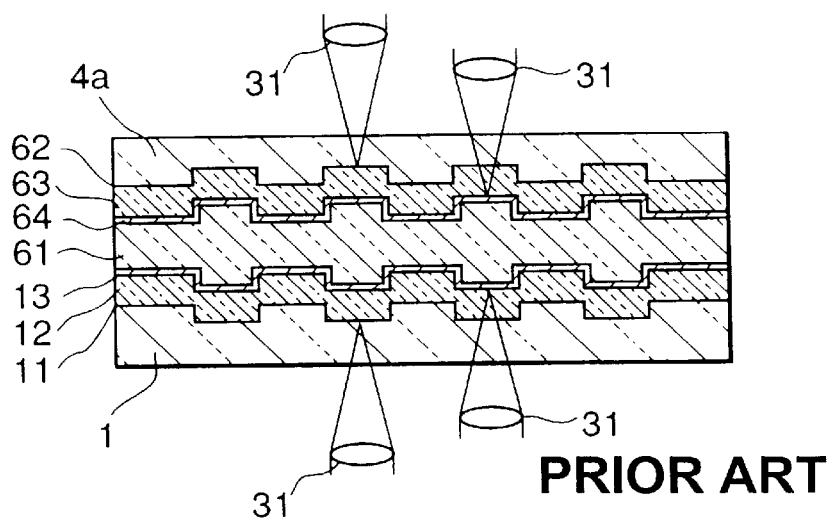
FIG. 10 is a cross-sectional view showing an optical disc to show the structure of DVD-18.

FIG. 5 is a cross-sectional view showing an optical disc according to a third embodiment of the present invention. In FIG. 5, the same elements as those of FIGS. 7 and 10 are represented by the same reference numerals, and the description thereof is omitted. In this embodiment, the first transparent substrate 1 having an information recording face is designed to have a sectional structure having two layers at one side as in the case of the first transparent substrate 1 of DVD-18 shown in FIG. 10.

Figure 9:
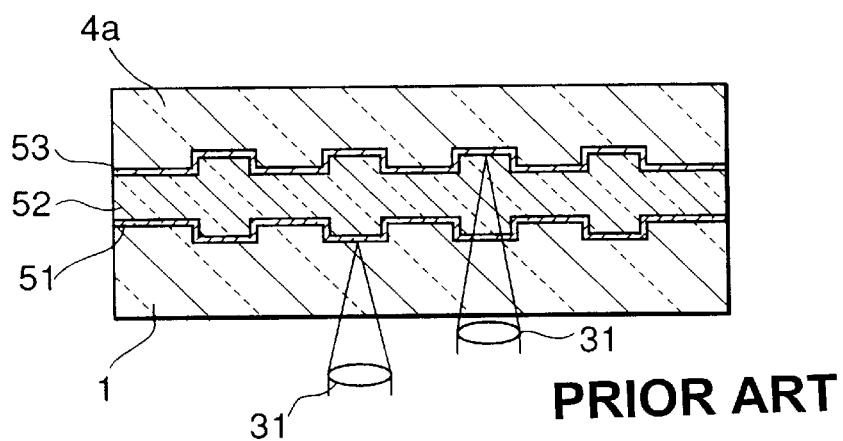
FIG. 9 is a cross-sectional view showing an optical disc to show the structure of DVD-9.

When the first transparent substrate 1 as described above and the dummy substrate (second transparent substrate 4) having no information recording face are bonded together, the recording capacity is equal to that of the DVD-9 shown in FIG. 9. However, a multi-layer print can be performed. In this embodiment, there is provided the two-layer print structure having the print layer 6 and the print layer 7, but, a print layer may be further provided on the back surface of the reflection film 13. Further, if the transparent protection film 3 shown in FIG. 1 is provided, the obverse surface of the transparent protection film 3 may be used as a print face on which a print layer is provided.

In each of the above-described embodiments, an ultraviolet-ray cured resin coat layer like the transparent protection film 3 may be provided on the obverse and/or back surface of the second transparent substrate 4 to use the obverse surface of the coat layer as a print layer. Likewise, if the ultraviolet-ray cured resin layers are formed in a multi-layer structure on each of the first transparent substrate 1 and the second transparent substrate 4, the number of print faces can be increased.

Figure 6:
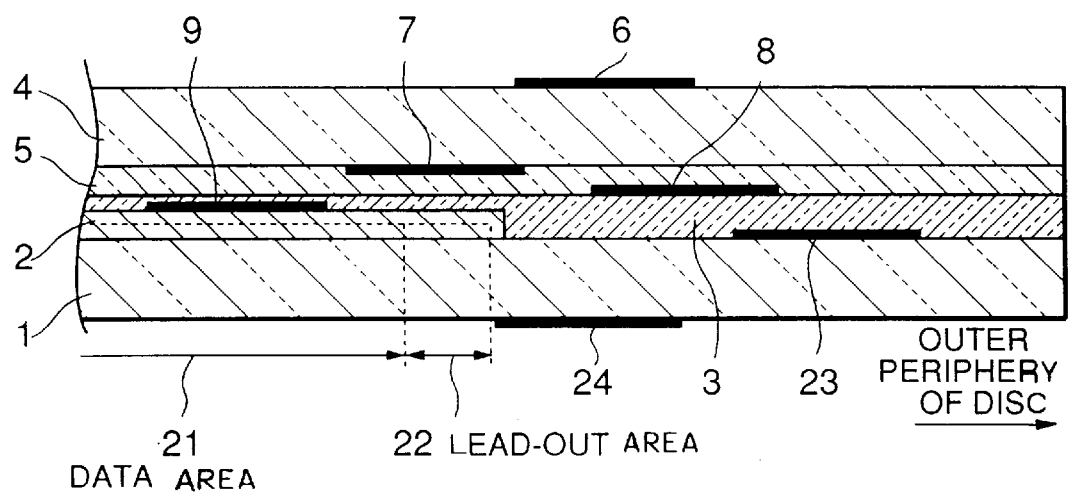
FIG. 6 is a cross-sectional view showing an optical disc according to a fourth embodiment of the present invention.

FIG. 6 is a cross-sectional view showing an optical disc according to a fourth embodiment of the present invention, and it is a cross-sectional view which is taken in the radial direction of the disc. In order to described a data area and an area located outwardly from the data area, the cross-sectional structure of the optical disc is illustrated as being compressed in the radial direction of the optical disc. The same elements as those of FIGS. 1 and 7 are represented by the same reference numerals, and the description thereof is omitted. In FIG. 6, reference numeral 21 represents a data area, reference numeral 22 represents a lead-out area and reference numerals 23 and 24 represents print layers.

In this embodiment, the back surface of the first transparent substrate 1 which is located outside of the lead-out area 22 of the information recording area of the first transparent substrate 1 is used as a fifth print face, and the print layer 23 is provided on the fifth print face. Further, the obverse surface of the first transparent substrate 1 which corresponds to the fifth print face is used as a sixth print face, and the print layer 24 is provided on the sixth print face. If the print layers 23 and 24 are added to the above-described print layers 6 to 8, the number of the print layers can be increased. In the area outside of the lead-out area 22, there is no reflection film 2, and thus no print layer is provided on the back surface thereof. However, a print display can be performed on five layers.

When the amount of programs and data which are recorded on the optical disc is smaller, the area outside of the lead-out area 22 is broader. Therefore, this area may be used for a print display.

An example of the embodiment shown in FIGS. 3 and 4 will be described in more detail.

A glass plate of 200 mm in diameter and 6.0 mm in thickness, whose surface was flattened by a polishing method or the like was subjected to a dehydrating baking treatment at 120° C. for 5 minutes by a hot plate, and an i-line positive type photo-resist (trade name: "ST11" produced by Nippon Zeon Co., Ltd.) was coated on the glass substrate by a spin coat method to form a glass master.

A laser beam was subjected to light intensity modulation in accordance with a recording signal by using an EO modulator to the like, and focused and irradiated onto the glass master coated with the photo-resist layer by an objective lens. In this recording operation, the recording diameter of a data recording area was set to 45 to 116 mm. After the post-bake and development treatments, an Ni plating treatment and an injection molding treatment were performed to obtain a transparent resin disc having a thickness of 0.6 mm and formed of polycarbonate. The reflection film 2 of aluminum (Al) was deposited at a thickness of 10 nm on the transparent resin disc by a sputtering method to obtain the first transparent substrate 1.

Further, a transparent substrate of 0.6 mm in thickness was used as the second transparent substrate 4, and the print layer 7 was printed on the second print face which would serve as the bonding face. In addition, the print layer 6 was also printed on the first print face. The first transparent substrate 1 and the second transparent substrate 4 were bonded to each other by using ultraviolet-rays cured resin to set the resin thickness of the transparent adhesive layer 5 to forty micrometers, thereby producing an optical disc having a print with a three-dimensional (stereoscopically viewing) effect and a depth-viewing effect.

Next, an example of the third embodiment shown in FIG. 5 will be described in more detail.

A transparent substrate of polycarbonate and 0.6 mm in thickness was obtained in the same manner as the example of the second embodiment. Thereafter, silicon nitride of 10 nm was deposited as a semi-transparent film 11 on the transparent substrate by the sputtering method, and an information face was further formed by the 2P method, and then aluminum (Al) of 100 nm was deposited as the reflection film 13 by the sputtering method to form the first disc substrate.

Further, a transparent substrate of 0.6 mm in thickness was used as the second transparent substrate 4, and the print layer 7 was printed on the second print face which would serve as the bonding face. In addition, the print layer 6 was also printed on the first print face. The first transparent substrate and the second transparent substrate 4 thus constructed were bonded together by using ultraviolet-ray cured resin, and the resin thickness of the transparent adhesive layer 5 was set to forty micrometers, thereby obtaining an optical disc having a print with the stereoscopically viewing effect and the depth-viewing effect.

The foregoing description is made on the modifications of the one-side one-layer reproduction type optical disc and the one-side two-layer reproduction type optical disc. If an optical information recording medium has the similar bonding sectional structure, plural print layers may be likewise provided on the optical medium. Further, the information recording face is not necessary required to be exclusively used for reproduction, but it may be designed so that information recording and reproducing can be performed on the disc.

The foregoing description does not contain any reference to the print ink. Any type of print ink such as pigment type, dye type or the like may be used insofar as it can be printed on the print face. The same type as the convention print ink which is used for the print on the CD surface may be used. In the conventional printing on the surface of the CD, a print layer is relatively protuberant, and also a light shielding color through which little light is transmitted is used for the print layer.

However, with respect to the print layers (such as the print layer 7 shown in FIG. 1) formed inside of the optical disc (hereinafter referred to as "internal print layers"), these internal print layers are preferably made thin because a synthetic resin layer is formed on these print layers. Further, with respect to the print layers (such as the print layer 6 shown in FIG. 1) formed on the surface of the optical disc or near to the surface of the optical disc (hereinafter referred to as "surface print layers"), if semi-transparent print ink through which light is easily transmissible is used for these surface print layers, these surface print layers are viewed while mixed with some internal print layers which are overlapped with the surface print layers, so that the surface print layers provide a transparency (clarity) viewing effect.

Further, metal foil or metal powder may be used solely or in combination with adhesive. Also, characters or patterns which are formed and recognizable with the same type of pits or unevenness as the information face may be provided on the back surface of the second transparent substrate 4. Such characters or patterns are contained in the concept of the print layer in the present invention.

The second transparent substrate 4, the transparent protection film 3 and the adhesive layer 5 are not necessarily designed to have a high transmissivity which is near to 100%. For example, dye or pigment may be mixed in synthetic resin material to reduce the transmissivity or to provide a transmissivity having a selectable wavelength. Further, when the print is performed only on the obverse and back surfaces of the second transparent substrate 4, the adhesive layer 5 is not required to be transparent. However, the first transparent substrate 1 needs a predetermined transmissivity to read out information from the information recording face using the pickup.

The print content is not necessarily limited to information which is in connection with recording information such as a title, a manufacturer, etc. Further, compared with the print layer provided at the external surface, the print layer provided inside of the optical disc is less liable to be peeled off due to time lapse or damage. Accordingly, highly important information is more suitably recorded on such an internal print layer, and the print content can be also prevented from being altered. Further, if an opaque print layer is provided in an area which is located on the obverse surface of the optical disc and corresponds to an area where such important information is printed, this information can be hidden from the outside.

As is apparent from the foregoing description, a print display having a stereoscopically (three-dimensionally) viewing effect and the depth-viewing effect can be performed, and an optical information recording medium having a large added value can be produced at a low cost.

Further, according to the present invention, when a print layer is provided in an area which is located on at least one of the obverse and back surfaces of the first transparent substrate and on which no information is recorded, the number of print layers can be increased, so that the print display can be performed with the stereoscopically viewing effect and the depth-viewing effect which are more enhanced.

What is claimed is:

1. An optical information recording medium on which a visible display having a stereoscopically viewing effect and a depth-viewing effect can be made comprising:

a first transparent substrate having an information recording surface covered by a reflection film;

a second transparent substrate having an obverse surface and a back surface opposite said obverse surface;

an adhesive layer bonded to said information recording surface of said first transparent substrate and to said second transparent substrate; and a print layer provided on said obverse surface of said second transparent substrate and on said back surface of said second transparent substrate.

2. An optical information recording medium on which a visible display having a stereoscopically viewing effect and a depth-viewing effect can be made comprising:

a first transparent substrate having an information recording surface covered by a reflection film;

a transparent protection film for covering said reflection film attached to said reflection film having a reflection film side and a second side opposite said reflection film side;

a second transparent substrate having an obverse surface;

an adhesive layer bonded to said transparent protection film and to said second transparent substrate;

a print layer provided on said obverse surface of said second transparent substrate and on the obverse surface of said transparent protection film.

3. An optical information recording medium on which a visible display having a stereoscopically viewing effect and a depth-viewing effect can be made comprising:

a first transparent substrate having an information recording surface covered by a reflection film;

a second transparent substrate having an obverse surface;

an adhesive layer bonded to said information recording surface of said first transparent substrate and to said second transparent substrate; and a print layer provided on said obverse surface of said second transparent substrate and on a back surface of said reflection film.

4. An optical information recording medium on which a visible display having a stereoscopically viewing effect and a depth-viewing effect can be made as claimed in claim 2 wherein said obverse surface of said transparent protection film is said reflection film side.

5. An optical information recording medium on which a visible display having a stereoscopically viewing effect and a depth-viewing effect can be made as claimed in claim 2 wherein said obverse surface of said transparent protection film is said second side.

6. An optical information recording medium on which a visible display having a stereoscopically viewing effect and a depth-viewing effect can be made comprising:

- a first transparent substrate having a first and second regions, wherein said first region comprises an information recording surface covered by a reflection film, and wherein said second region is radially adjacent said first region;
- a second transparent substrate having an obverse surface;
- an adhesive layer bonded to said information recording surface of said first transparent substrate and to said second transparent substrate; and
- a print layer provided on said obverse surface of said second transparent substrate and on said second region of said first transparent substrate.

7. An optical information recording medium on which a visible display having a stereoscopically viewing effect and a depth-viewing effect can be made comprising:

- a first transparent substrate having a first and second regions, wherein said first region comprises an information recording surface covered by a reflection film, and wherein said second region is radialy adjacent said first region;
- a transparent protection film for covering said reflection film attached to said reflection film having a reflection film side and a second side opposite said reflection film side;
- a second transparent substrate having an obverse surface;
- an adhesive layer bonded to said transparent protection film and to said second transparent substrate;
- a print layer provided on said obverse surface of said second transparent substrate and on said second region of said first transparent substrate.

8. An optical information recording medium on which a visible display having a stereoscopically viewing effect and a depth-viewing effect can be made as claimed in claim 1, further comprising a transparent protection film for covering said reflection film attached to said reflection film having a reflection film side and a second side opposite said reflection film side.

* * * * *